United States Patent [19]

Scheetz

[11] 4,391,943

[45] Jul. 5, 1983

[54] UV STABILIZED NYLON 6

[75] Inventor: Howard A. Scheetz, Lancaster, Pa.

[73] Assignee: The Polymer Corporation, Reading, Pa.

[21] Appl. No.: 336,713

[22] Filed: Jan. 4, 1982

[51] Int. Cl.$^3$ .................. C08K 3/04; C08L 67/00; C08L 77/00
[52] U.S. Cl. ............................ 524/538; 524/539; 525/425
[58] Field of Search ............ 524/538, 539; 525/425

[56] References Cited

U.S. PATENT DOCUMENTS 4,014,957  3/1977  Kirsch et al. .................. 525/425

Primary Examiner—Allan Lieberman
Attorney, Agent, or Firm—Richard O. Church

[57] ABSTRACT

Nylon 6 molding and extrusion grade resins are stabilized against UV degradation by the addition of small amounts of carbon black. The elongation and impact strength of the nylon are preserved, if not improved, by melt blending from 5% to 50% by weight of an elastomeric polyester with the nylon and carbon black.

2 Claims, No Drawings

ID STABILIZED NYLON 6

UV STABILIZED NYLON 6

TECHNICAL FIELD

This invention relates to nylon 6 molding and extrusion resins and, more particularly, to nylon 6 resins that are filled with carbon black to prevent ultra-violet degradation.

BACKGROUND

Nylon 6, a polymer of caprolactam, is a well-recognized engineering plastic. As is characteristic of these materials, nylon is strong, is capable of withstanding considerable abuse, it has a low coefficient of friction, long wear life and makes an excellent bearing element.

Nylon does not age well in strong sunlight and it is conventional to fill it with a few percent carbon black for outdoor weathering applications. It is well recognized that carbon black prevents ultra-violet degradation in many polymers by scattering and absorbing damaging radiation and by acting as a free radical trap. UV protection is reported best achieved in carbon blacks in the 16 to 20 micrometer particle diameter range when well dispersed in concentrations between about 2 to 3 percent by weight.

Carbon black greatly improves the properties of many polymers such as rubber. This is not the case with nylon, however, and the addition of carbon black, even in small quantities much less than 1%, can significantly lower elongation, notched Izod, impact strength and other physical properties.

Accordingly, it is the object of this invention to provide a novel nylon composition that has good UV stability without unduly sacrificing physical property such as elongation, notched Izod and impact strength.

DISCLOSURE OF THE INVENTION

Briefly, these and other objects of this invention are achieved by melt blending between 0.5% and 5% by weight carbon black and from 5% to 50% by weight of a polyester elastomer into nylon 6. This blend provides a nylon 6 molding powder that combines good mechanical properties and resistance to UV radiation.

In a patent application of common inventor and assignee filed of even date entitled "Impact Modified Nylon 6," it is disclosed that polyester elastomers have been found to be miscible and compatible above their melting point with nylon 6 and, when melted together, the melt viscosity of the melt blend is higher than that of either polymer. This latter observation implies that intermolecular reactions take place between the polymers, as by chain branching or chain extension, resulting in an apparent increase in molecular weight.

When the carbon black is added to the nylon, in combination with a polyester elastomer, the elongation and the impact strength of the molding powder are not impaired but, surprisingly, are improved.

As mentioned in my co-pending application, the addition of polyester elastomer improves the impact properties of the nylon and the increased melt viscosity facilitates melt forming processes. The polymeric blend is easier to extrude, the extrudate has improved ovality and is less subject to cracking during extrusion and annealing, and the surface of the extrudate is unusually smooth. Because of the concentricity and smoothness of the extrudate, it is easier to extrude to desired dimensional tolerances so that secondary operations, such as centerless grinding and planing, may often be eliminated. If the blend is extruded in the form of small diameter rod which is chopped to make molding pellets, the smooth surface makes it easier to feed the pellets to extruders and injection molding machines.

Polyester elastomers are unique in that they perform like conventional cross-linked elastomers over a wide temperature range but soften reversibly and flow at elevated temperatures. Consequently, they may be processed as thermoplastics, as by extrusion and other common forming techniques.

Polyester elastomers are block copolymers in which one component is an amorphous chain segment having a relatively low glass transition temperature. These portions of the molecule are referred to as "soft" segments and impart elasticity to the polymer. In addition, to prevent long range flow, the molecule must form a thermally reversible network structure in which some inter-molecular associations can unite the chains without the covalent cross-links that are common to thermosetting resins or cured rubbers. The portions of the molecule that undergo this type of association are referred to as the "hard" segments. In an article entitled "Mechanical Performance of Polyester Elastomers" presented to the Dutch Association of Plastic Processors in October, 1972, and reported in *Overdrukuitplastica*, pages 438 through 448 in October of 1973, the polyester elastomers marketed by duPont under the trademark Hytrel are described as being made from a terephthalate, a polyglycol and short chained diols. When these ingredients are reacted to form a high molecular weight polyester copolymer, diol/terephthalate blocks form the crystaline hard segments and the ether glycol/terephthalate units form the soft amorphous phase containing units of ether glycol terephthalate. Polyester elastomers are also marketed by Akzo under the trademark Arnitel.

It was further disclosed in *Overdrukuitplastica* that Hytrel polyester elastomers are made from three ingredients:
(1) a terephthalate;
(2) a polyglycol such as polytetramethylene ether glycol, polyethylene ether glycol, or polypropylene ether glycol; and
(3) short chain diols like butanediol and ethylene glycol.

When these are reacted to form high molecular weight polymers, the relative proportions of the hard segments to the soft segments will determine the hardness or stiffness of the family member.

EXAMPLE 83 weight percent of a nylon 6 resin was mixed with 2% by weight carbon black (Black Pearls 800- ®Cabot) and 15 weight percent of a polyester elastomer (Hytrel ® 5556-DuPont). The resins and the carbon black were fed through a mixing extruder, melted and extruded at 220° C. in the form of ⅛ inch strands. The strands had an extremely smooth surface and were chopped into ⅛ inch lengths to form a molding resin. This molding resin, in turn, was then extruded into a 1 inch rod. The polymeric blend was much easier to extrude than an unmodified nylon 6 due to its higher melt strength. It not only extruded more readily with very little of the stick-start type of operation usually observed with nylons but also the extruded rod had improved ovality and smoothness and had less tendency to crack during extrusion and subsequent annealing. The smoothness and dimensional tolerance of the rod was sufficiently good that centerless grinding was not required.

A sample of the rod was tested for notched Izod (ASTM D-256) and elongation at break and compared to an unfilled nylon 6 and a blend of 85% nylon 6 and 15% polyester elaster. The results are tabularized below.

|  | Nylon 6, Carbon Black, Polyester | Nylon 6, Polyester | Nylon 6 |
|---|---|---|---|
| Notched Izod | | | |
| (ft. lb./in.) | 2.0 | 1.8 | 0.7 |
| Elongation (%) | 180 | 80 | 10 |

I claim:

1. A UV stabilized nylon 6, a polymer of caprolactam, containing about 0.5% to 5.0% carbon black, the improvement comprising the addition of from 5% to 50% by weight of a polyester elastomer.

2. A method for improving the impact properties of a nylon, a polymer of caprolactam, 6 molding resin filled with carbon black, which comprises melt blending 5% to 50% by weight of a polyester elastomer with the nylon and carbon black.